US006917588B1

(12) United States Patent
Cao et al.

(10) Patent No.: US 6,917,588 B1
(45) Date of Patent: Jul. 12, 2005

(54) APPARATUS AND METHOD FOR CLASSIFYING DATA PACKET FLOWS

(75) Inventors: Carl F. Cao, Nepean (CA); Don W. Bennett, Ottawa (CA); Yajun Liu, Nepean (CA); Nabil N. Seddigh, North Gower (CA); Biswajit B. Nandy, Kanata (CA); Dabin Wang, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/571,160

(22) Filed: May 16, 2000

(51) Int. Cl.[7] .............................. H04J 3/14; H04J 1/16

(52) U.S. Cl. ............... 370/230.1; 370/253; 370/395.21; 370/412; 370/468

(58) Field of Search .............................. 370/230.1, 253, 370/395.21, 412–416, 468, 229, 231.1, 395.3, 395.42, 395.43, 410, 232, 395.1, 395.4

(56) References Cited

U.S. PATENT DOCUMENTS 5,592,470 A * 1/1997 Rudrapatna et al. ........ 370/320
6,023,456 A * 2/2000 Chapman et al. ........... 370/252
6,065,052 A * 5/2000 Van Loo ..................... 709/224
6,295,532 B1 * 9/2001 Hawkinson .................... 707/4

* cited by examiner

*Primary Examiner*—Dang Ton
*Assistant Examiner*—Inder Pal Mehra

(57) ABSTRACT

Currently there are two techniques used to classify data packet flows, those techniques being static and dynamic. A proper combination of these two techniques can allow for the advantages of both techniques to be gained while reducing their respective disadvantages. With this combined flow classification method a flow is classified initially with the use of a static classification method while, at the same time, a dynamic classification method is initiated. If at any point during the dynamic classification method, the classifications derived from the static and dynamic algorithms converge, the flow's classification is henceforth assigned by the dynamic classification method. If a predetermined number of packets or length of time that would be required for the dynamic and static classification algorithms to converge is exceeded, the flow's classification, once again, is henceforth assigned by the dynamic classification method. This allows the initial classification of the flow to occur quickly with the static classification method and the accuracy of dynamic flow classification techniques to take over once such a classification is deemed accurate.

28 Claims, 3 Drawing Sheets

NEW FLOW
N = 1; $C_d = C_1$ — 40
DETERMINE $C_S$ — 42
$C = C_S$ — 44
IS $C_S = C_d$? — 46 (YES / NO)
ANALYZE DYNAMIC CHARACTERISTICS OF FLOW AS EACH PACKET ARRIVES — 50
N = N+1 — 52
DETERMINE $C_d$ — 54
IS $C_S = C_d$? — 56 (YES / NO)
IS $N > f * E(C_S)$? — 58 (YES / NO)
$C = C_d$ — 48

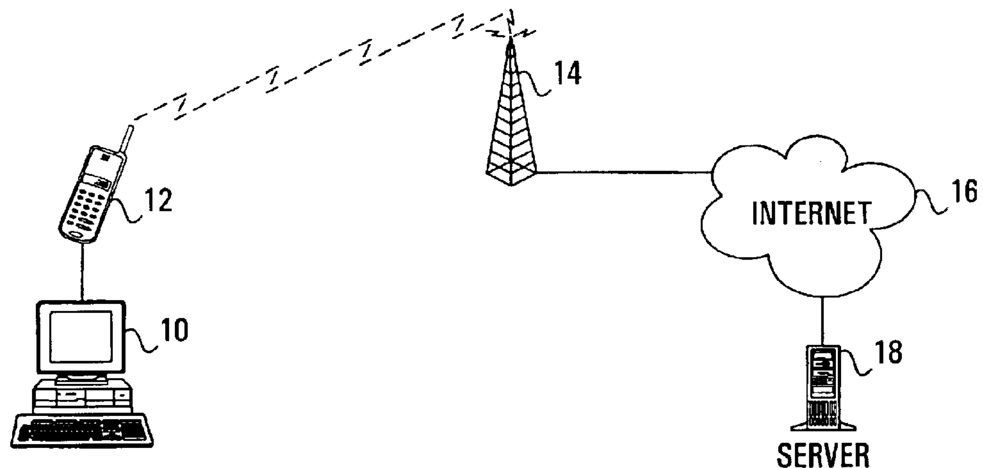
FIG. 1
IQR
IF BURST FLOW CHARACTERISTICS DETECTED
BURST DATA TRANSFER
IF BULK FLOW CHARACTERISTICS DETECTED
BULK DATA TRANSFER
FIG. 2
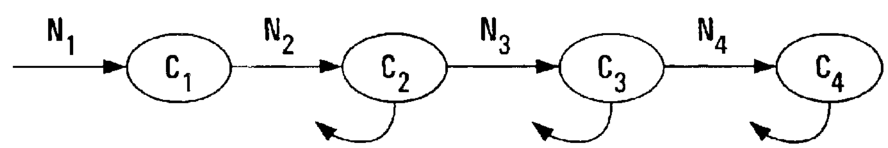
FIG. 3

APPARATUS AND METHOD FOR CLASSIFYING DATA PACKET FLOWS

FIELD OF THE INVENTION

This invention relates generally to data packet flows and, in particular, to apparatus and methods used for classification of data packet flows.

BACKGROUND OF THE INVENTION

The classification of data packet flows is an important aspect of data packet communications. When a new flow is identified, well-known classification procedures attach a classification indication to the data packets of the particular flow based upon the flow's characteristics. Each flow classification has a corresponding level of Quality of Service (QoS) and allocation of network resources. Thus, once a particular classification has been selected for a data packet flow, the appropriate level of QoS and network resources is automatically selected for the particular flow.

The use of the appropriate level of QoS for each data packet flow is important in normal data packet communications in order to increase efficiency, but is especially important when considering wireless applications of packet data communications. FIG. 1 illustrates an example of a wireless data packet network in which the proper classification of data packet flows is crucial to the overall efficiency of the network. In this figure, a computing apparatus 10 is coupled to a mobile station 12 that further communicates, via wireless channels, with a basestation 14 within a wireless network infrastructure. The basestation 14 is further coupled, via the Internet 16, to a data server 18. In the network of FIG. 1, the computing apparatus 10 and the data server 18 can communicate with the sending of data packet flows in either direction, these flows of data packets traversing the mobile station 12, the basestation 14 within the wireless infrastructure and the Internet 16. Due to significant limitations on the quantity and quality of communications being transmitted via the wireless channels between the mobile station 12 and the basestation 14 of the wireless infrastructure, the selection of the appropriate QoS for each data packet flow is highly important, thus leading to the significance of the flow classification.

There are a number of different techniques that have been attempted to classify data packet flows appropriately. The current most common method of classification within industry is referred to as static flow classification, static flow classification being the use of pattern matching with one or more of Layer 3 (L3) through Layer 7 (L7) headers and/or the payload information to decide upon a flow classification for the entire flow, the pattern matching normally being performed only on the first packet of the flow. The key advantages of using static flow classification, as currently designed, is the general simplicity of the classification decision process, as well as the satisfactory speed and normal reliability of the decision making procedure.

Unfortunately, there are situations where the reliability of the static classification procedure is in question. Some of these situations include: during the use of Layer 7 (L7) protocols in non-default applications; during the use of non-standard Layer 4 (L4) port numbers; when the class of the data packet flow is dynamically changing; and where the different headers of the packet are encrypted. In fact, when the packets of the flow are encrypted, the static flow classification technique is not useable and another technique for classification must be used.

Another technique for classification of flows that can be utilized is dynamic flow classification as is disclosed within U.S. Pat. No. 6,023,456 entitled "Dynamic Traffic Conditioning" by Chapman et al, assigned to the assignee of the present invention and herein incorporated by reference. In dynamic flow classification, the dynamic flow behaviour of the flow is monitored for a period of time and, based on this behaviour, the class of the flow is changed. In this case, the dynamic flow behaviour can include such dynamic characteristics as interval time between packets, frequency of packets and size of packets being sent within the particular flow. Thus, dynamic flow classification does not depend on the accuracy of the static patterns in packet headers, and it can adjust its classification decision in relation to the time variations of the flow.

Generally, using dynamic flow classification can result in a more accurate classification for a flow, as it overcomes most of the limitations described above for the static flow classification technique. In particular, the dynamic flow classification technique, as disclosed within U.S. Pat. No. 6,023,456, can successfully be utilized for flows with encrypted packets; flows with non-standard layer headers and/or ports; and flows that change in behaviour during transmission.

Unfortunately, dynamic flow classification is unavailable for the earlier packets of a flow and instead defaults to a predetermined initial classification. After this initial selection of a default classification, the classification of the flow is modified until the assigned classification matches the behaviour of the flow being observed. This convergence between the assigned classification and the observed behaviour can take a significant number of packets and/or period of time and, during this transitory period, the temporary classifications will likely be inaccurate. This initial inaccuracy in the selection of a flow classification can cause significant inefficiencies and make the use of the dynamic flow classification technique unable to work for short flows.

SUMMARY OF THE INVENTION

The present invention is directed to apparatus and methods used for classifying data packet flows with a combination of static and dynamic flow classification techniques. Embodiments of the present invention attempt to optimize the use of both classification methods such that the disadvantages of each flow classification technique are minimized while benefiting from their respective advantages. With the use of preferred embodiments of the present invention, a flow is classified initially with the use of a static classification method, if such a classification is possible while, at the same time, a dynamic classification method is initiated. If at any point during the dynamic classification method, the classifications derived from the static and dynamic methods coincide, the flow's classification is henceforth assigned by the dynamic classification method. If a predetermined number of packets or length of time that would be required for the dynamic and static classification methods to coincide is exceeded, the flow's classification, once again, is henceforth assigned by the dynamic classification method. This allows the initial classification of the flow to occur quickly with the static classification method and the accuracy of dynamic flow classification techniques taking over once such a classification is deemed accurate.

The present invention, according to a first broad aspect, is a computing apparatus arranged to receive a flow of data packets. The computing apparatus includes static flow classification logic, dynamic flow classification logic and classification selection logic. The static flow classification logic operates to determine a static classification for the flow using static information corresponding to at least one of the packets. The dynamic flow classification logic operates to determine a dynamic classification for the flow using dynamic information corresponding to a plurality of the packets within the flow. Finally, the classification selection logic operates to assign one of the static and dynamic classifications to the flow.

Within preferred embodiments of the present invention, the classification selection logic initially assigns the static flow classification to the flow and subsequently assigns the dynamic flow classification to the flow once at least one transitional test has been passed. In some embodiments, the transitional test is passed when the dynamic classification becomes equal to the static classification and/or a predetermined number of packets within the flow have been received. The predetermined number of packets, in one embodiment, is equal to a predetermined factor multiplied by an estimated minimum number of packets required for the dynamic classification to become equal to the static classification. In other embodiments, the transitional test is passed when a time period has expired from initially receiving packets of the flow.

The present invention, according to a second broad aspect, is a method for assigning a flow classification to a flow of data packets. This method includes determining a static classification for the flow using static information corresponding to at least one of the packets. Further, the method includes determining a dynamic classification for the flow using dynamic information corresponding to a plurality of the packets within the flow. Finally, the method yet further includes assigning one of the static and dynamic classifications to the flow based upon selection criteria.

According to a further aspect, the present invention is a computer readable memory arranged to store a classification software that can be run on a computing apparatus that receives a flow of data packets. This classification software essentially operates to perform the method of the second broad aspect.

According to yet a further aspect, the present invention is a packet data network for transmitting flows of data packets. In this aspect, the packet data network includes at least one transmission link and a computing apparatus similar to that described above for the first broad aspect. In this case, the computing apparatus further includes transmission means for transmitting the flow on the at least one transmission link with a quality of service based upon the assigned classification for the flow. Preferably, the transmission link includes a wireless channel.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The preferred embodiment of the present invention is described with reference to the following figures, in which:

FIG. 1 is a block diagram illustrating a sample wireless data packet network in which the present invention could be implemented;

FIG. 2 is a state diagram illustrating a simple dynamic classification scheme;

FIG. 3 is a state diagram illustrating a dynamic classification scheme according to an embodiment of the present invention;

DETAILED DESCRIPTION OF THE PREFERRED EMBODIMENT

Embodiments of the present invention are directed to apparatus and methods for classifying data packet flows. In these embodiments, a simple and effective method is provided for dynamic flow classification that exploits the speed and immediate availability of static flow classification. To accomplish this, the embodiments of the present invention combine these two flow classification techniques. In preferred embodiments, the packet data flow is initially classified based upon a static flow classification method and, subsequently, once one of a series of transitional parameters is met, is classified based upon a dynamic flow classification method. One of these transitional parameters is met when the class decision of the dynamic flow classification method has converged with the class decision of the static flow classification method. Another of these transitional parameters is met if it is determined that the dynamic flow classification does not converge with the static flow classification. In this case, the dynamic flow-classification will preferably wait until an expected number of packets and/or expected amount of time needed to transition the dynamic flow classification to the flow classification has been exceeded before proceeding to classify the packet data flow by the dynamic flow classification method.

Figure 4:
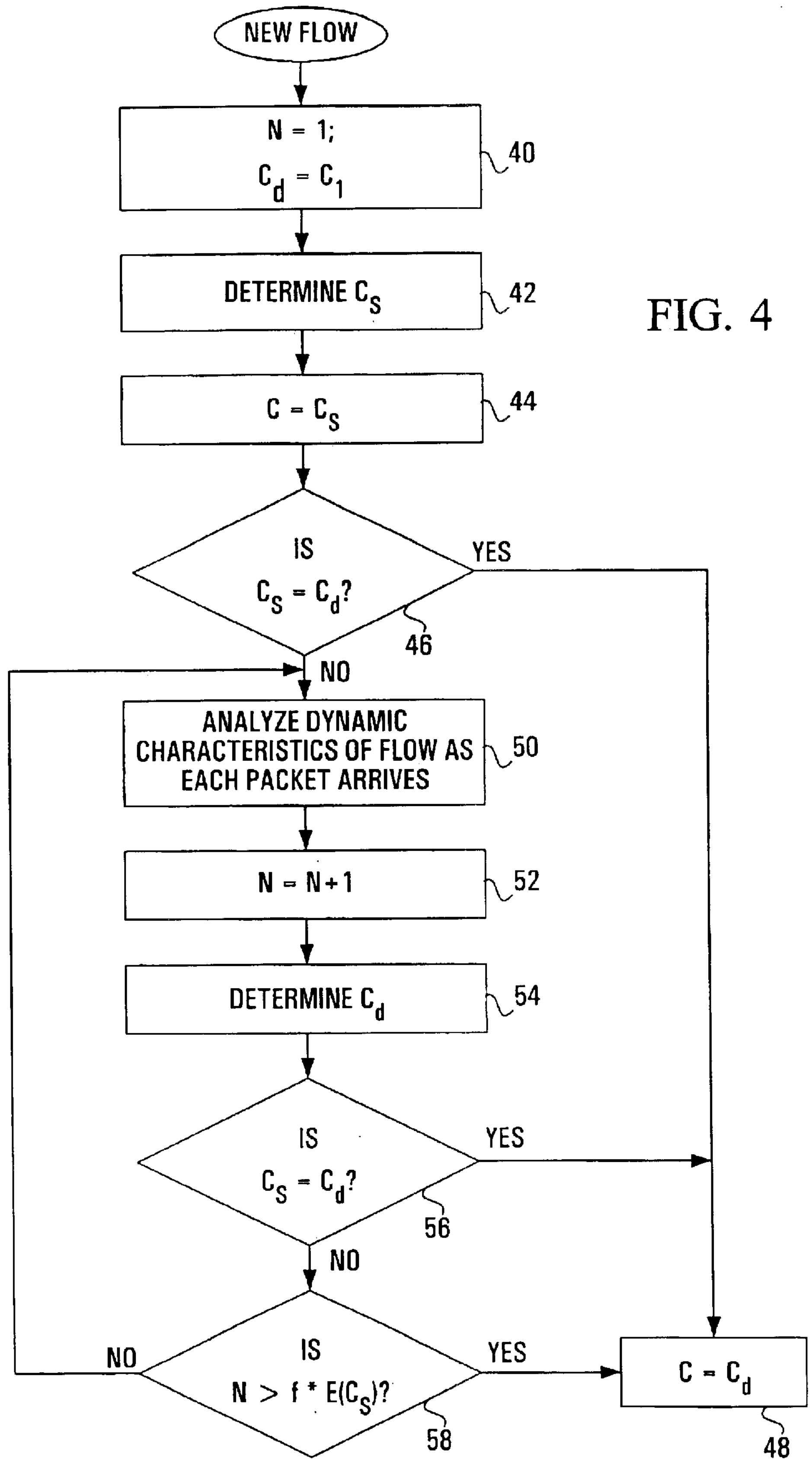
FIG. 4 is a flow chart illustrating the steps performed in the selection of a flow classification according to a preferred embodiment of the present invention.

Prior to describing a specific implementation of the present invention with reference to FIGS. 3 and 4, two examples in which static and dynamic flow classification methods could be utilized with varying advantages and disadvantages are described; the dynamic flow classification method being based upon the state diagram of FIG. 2.

In a first example, an email message that has a large attachment, such as a picture, is being transmitted via a particular link. Using a well-known static flow classification method, the flow comprising the email message would be classified as a burst data transfer flow, which requires a set amount of QoS resources, since the initial packets of the email message used for protocol header matching would indicate such a flow type. The problem with the use of the static flow classification method in this case is that, although the email message should initially be classified as a burst data transfer flow, when the attachment is subsequently sent, the flow class preferably should be modified to indicate a bulk data transfer flow which requires an increase in QoS requirements. Using a dynamic flow classification method, such as that illustrated in the state diagram of FIG. 2, in this same situation, the flow would initially be set as a default Interactive Query Response (IQR) flow and would subsequently be classified as a burst data transfer flow once the burst flow characteristics of the email message are detected. Next, once the characteristics of the flow are modified to a bulk data transfer during transmission due to the transmission of the large attachment, a corresponding modification in the flow's classification would take place once the bulk flow characteristics of the flow are detected. These bulk flow characteristics in some cases could be a predetermined number of consecutive data packets arriving within a predetermined time period.

In a second example, a series of packets that comprise a burst data packet flow, such as an email message with no large attachment, are being transmitted via a particular link. In this case, if the static flow classification method is utilized, the flow will initially be classified as a burst data transfer flow based upon protocol header matching of the first series of packets in the flow. If the dynamic flow classification method is utilized based upon the state diagram of FIG. 2, the flow would initially be classified as an IQR flow and only after the burst flow characteristics of the email message are detected will the class of the flow be modified to a burst data transfer flow. In this example, the use of the dynamic flow classification method leads to a period of time in which the flow is incorrectly classified, resulting in inefficiencies.

Hence, it can be seen that depending upon the situation, there can be advantages and disadvantages to each of the techniques for flow classification as currently known.

Preferred embodiments of the present invention essentially compensate for the time lag before convergence that can occur with the use of dynamic classification methods by initially using the static flow classification method prior to transitioning at some future point to the results generated by the dynamic flow classification method. These preferred embodiments can be summarized with the use of three basic rules.

RULE 1: Initially, the class (C) of a data packet flow is determined with use of a well-known static flow classification method. That is, initially $C=C_s$, where $C_s$ is the class determined with use of the static classification method.

RULE 2: If the class determined with the use of a dynamic flow classification method converges at any point with the class determined with use of the static flow classification method, the class (C) of subsequent packets in the flow is determined with use of the dynamic flow classification method. That is, if $C_s$,$=C_d$, where $C_d$ is the classification determined with a dynamic flow classification method, then $C=C_d$ for subsequent packets in the data packet flow.

RULE 3: If at any point the number of packets of the flow that are analyzed is greater than an expected number of packets the dynamic flow classification method would require to reach the class determined by the static flow classification method multiplied by a decision factor, the class (C) of subsequent packets in the flow is determined with use of the dynamic flow classification method. That is, if $N>f*E(C_s)$, where f is the decision factor, N is the number of data packets of the flow observed and $E(C_s)$ is the expected number of packets the dynamic flow classification method needs to reach the class ($C_s$) determined with use of the static flow classification method, then $C=C_d$ for subsequent packets in the data packet flow.

Although, as described above, the variable N is the number of data packets of the flow that have been observed and $E(C_s)$ is-the expected number of packets the dynamic flow classification method needs to reach the class ($C_s$) determined with use of the static flow classification method, these definitions should not limit the scope of the present invention. The variable $E(C_s)$ could alternatively represent an expected time period for the dynamic flow classification method to converge with the static flow classification based upon the determined class for the static flow classification method or even could represent a combination of expected number of packets and expected length of time. The variable N is based upon the variable $E(C_s)$ and so the variable N could represent the number of packets that have been analyzed, the length of time that has passed since the first packet of the flow, or even a combination of these measurements. The definitions of these variables depends upon the particular criteria used by the particular dynamic flow classification method to determine whether an increase or decrease in class is required for a data packet flow.

It should be noted that the decision factor f is a value that adjusts the expected number of packets needed to be observed and/or the length of time of observation if the dynamic flow classification method does not converge. A higher value for decision factor f leads to an increase in the number of packets (length of time) to be observed, prior to switching the classification of the data packet flow to the dynamic flow classification method. In essence, the decision factor f can be seen as a measure of the users confidence in the transitional criteria limits used within the particular dynamic flow classification method. In some embodiments, the decision factor is equal to one and therefore the expression $N>f*E(C_s)$ simplifies to $N>E(C_s)$.

A specific implementation of the rules described above for preferred embodiments of the present invention will now be described with reference to FIGS. 3 and 4. The state diagram of FIG. 3 illustrates a sample dynamic flow classification method that can be utilized with the implementation of the present invention described herein below with reference to FIG. 4. In this sample case, there are four possible flow classifications, Class 1 ($C_1$) through Class 4 ($C_4$), for any given data packet flow. With use of this dynamic flow classification algorithm, a flow is initially assigned to be Class 1 ($C_1$) after $N_1$ packets. Within a subsequent $N_2$ packets, the flow classification could change from Class 1 ($C_1$) to Class 2 ($C_2$) or, alternatively, remain as Class 1 ($C_1$). Subsequently, the flow classification could further be changed to Class 3 ($C_3$) within an additional $N_3$ packets and yet further to Class 4 ($C_4$) within an even further $N_4$ packets. Hence, using the dynamic classification algorithm of FIG. 3, the flow could be classified as a Class 1 ($C_1$) flow within a minimum of $N_1$ packet(s), a Class 2 ($C_2$) flow within a minimum of $N_1+N_2$ packets, a Class 3 ($C_3$) flow within a minimum of $N_1+N_2+N_3$ packets or a Class 4 ($C_4$) flow within a minimum of $N_1+N_2+N_3+N_4$ packets. As well, the flow classification for a particular packet flow could be reduced from a classification requiring high QoS resources to a classification requiring lower QoS resources if dynamic characteristics of the data packet flow dictated such a change.

Although, as described above, $N_1$, $N_2$, $N_3$ and $N_4$ are the number of packets that are required to change the classification of a data packet flow from one class to the next class, it should be understood that these $N_i$ values could alternatively be predetermined time periods for the transitions from one class to another class to take place or a combination of predetermined time periods and number of packets that are required for the transition. Similar to the variables N and $E(C_s)$ described above, the $N_i$ value' definition depends upon the particular criteria used by the particular dynamic flow classification method to determine whether a change in class is required.

Further, it should be noted that although the state diagram of FIG. 3 includes four classes for data packet flows, a dynamic classification scheme according to preferred embodiments of the present invention should not be limited to four classes, as more or less classes are possible. In general, there could be j classes, $C_1$ through $C_J$, with each class having a particular number of packets and/or time period required for a transition. For a linear system, each class $C_i$ would require $N_1+N_2+\ldots+N_i$ packets and/or time intervals in order to be transitioned to the particular class.

Yet further, the linear arrangement within the state diagram of FIG. 3 is not meant to limit the scope of the present invention. In other embodiments of dynamic classification algorithms, there could be a plurality of independent transition possibilities from one class to one or more other classes depending upon the criteria that are met.

An implementation of a flow classification method according to an embodiment of the present invention will now be described with reference to the flow chart of FIG. 4. In this description, the dynamic flow classification method as described above with reference to the state diagram of FIG. 3 will be utilized, though this should not limit the scope of the present invention or this implementation.

Initially, as depicted at step 40, for each new data packet flow, N is set to one upon receiving the first packet of a flow and the initial state of the dynamic flow classification method is set to a default class, Class 1. ($C_1$) in this case. In this sample implementation of the present invention, N is equal to the number of data packets within the flow that have been analyzed. Similar to that discussed above, this variable N could alternatively represent a time period or a combination of the number of packets and a time period.

Next within the procedure of FIG. 4, a classification for the data packet flow is determined using a static flow classification method at step 42, this determined classification subsequently being assigned as the class (C) for the particular data packet flow at step 44. Preferably, the static flow classification ($C_s$) is determined with the use of well-known protocol header matching techniques with the first and/or second packets of the flow, though other static flow classification methods could be used.

Next, it is determined, as depicted at step 46, whether the determined static flow classification ($C_s$) is equal to the initial dynamic classification ($C_d$), that being Class 1 ($C_1$) in this case. If they are equal, the class (C) for the data packet flow is set to be henceforth equal to the class ($C_d$) determined with use of the dynamic flow classification method as depicted at step 48.

If the class ($C_s$) determined with the static flow classification method is not equal to the initial dynamic classification ($C_d$) at step 46, the classification of the data packet flow remains as the static flow classification ($C_s$) and the procedure analyzes at step 50 the dynamic characteristics of the flow as each packet arrives. With the arrival of each packet of the flow, the variable N increases by one at step 52 and, based upon the analysis of the dynamic characteristics of the flow, the dynamic flow classification ($C_d$) for the flow may be modified at step 54. If at any time in this procedure, the static classification of the flow determined at step 42 equals the current class of the data packet flow determined with use of the dynamic classification method, the procedure proceeds, as depicted at step 56, to step 48 and henceforth assigns the class (C) of the data packet flow based upon the dynamic flow classification method. If, as depicted at step 58, the variable N becomes greater than a decision factor (f) multiplied by an estimate ($E(C_s)$) of the number of packets required for the dynamic flow classification ($C_d$) to converge with the static flow classification ($C_s$), the procedure also proceeds to step 48 and henceforth assigns the class (C) of the data packet flow based upon the dynamic flow classification method. In the case of the dynamic flow classification method according to FIG. 3, this estimate ($E(C_s)$) can be defined by the following equation:

$$E(C_s)=N_1+N_2+\ldots+N_i, \text{ where } i=s$$

If the variable N has not yet exceeded the decision factor (f) multiplied by the estimate ($E(C_s)$) at step 58, the procedure of FIG. 4 returns to analyzing dynamic characteristics of the flow at step 50 as a further packet arrives.

It is noted that eventually, using the flow chart of FIG. 4, either the class ($C_d$) determined by the dynamic flow classification method will at some point converge with the class ($C_s$) determined by the static flow classification method OR the variable N will exceed the product of the decision factor (f) and the estimate ($E(C_s)$). Hence, in the end, the classification of the data packet flow will be determined with use of the dynamic flow classification method.

Figure 5A:
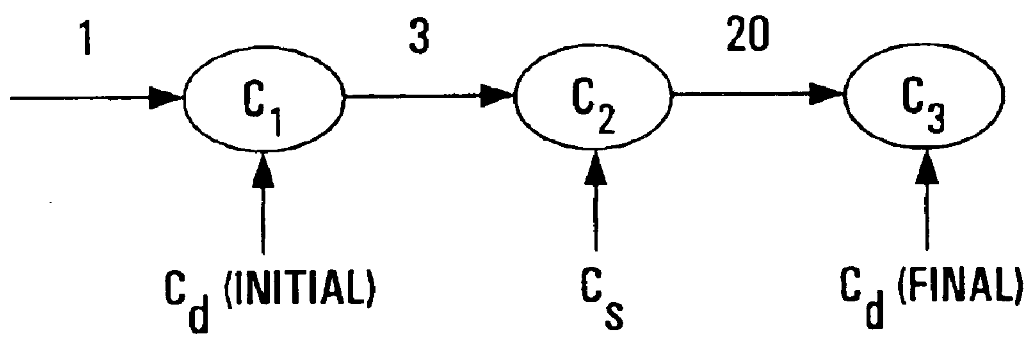
FIGS. 5A and 5B are state diagrams illustrating sample implementations of a flow classification procedure according to the flow chart of FIG. 4.
Figure 5B:
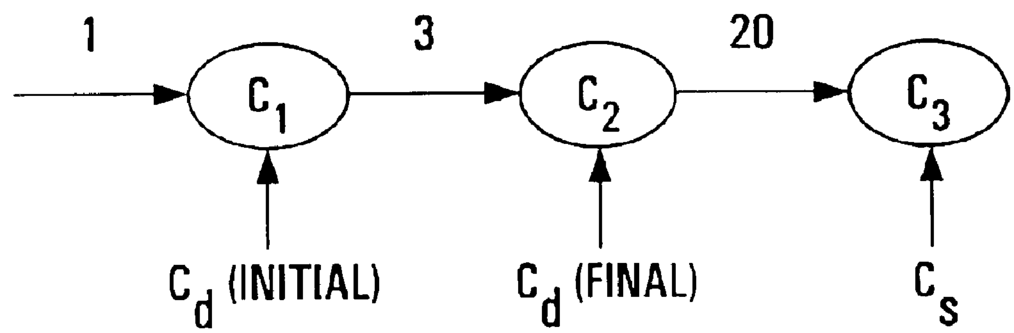

A number of sample operations using the flow classification method according to preferred embodiments of the present invention will now be described with reference to FIGS. 5A and 5B in order to emphasize the use of the second and third rules described above. In these sample operations, the dynamic flow classification method has three possible classes for any data packet flow, these being Class 1 ($C_1$), Class 2 ($C_2$) and Class 3 ($C_3$). As depicted in FIGS. 5A and 5B, the configuration of these classes are linear with the values for $N_1$, $N_2$ and $N_3$ being 1, 3 and 20 packets respectively.

In the first case illustrated in FIG. 5A, Class 2 ($C_2$) is determined as the class for the data packet flow with use of the static flow classification method being applied to the first packet of the data packet flow. Further, after the first packet of the data packet flow has been received, the dynamic flow classification method assigns Class 1 ($C_1$) as the class for the data packet flow. At this point, the class for the data packet flow is set to Class 2 ($C_2$), the static flow classification ($C_s$), using the flow classification method of FIG. 4.

Subsequently, after a further three packets have arrived, the dynamic flow classification method will reassign the class of the data packet flow to Class 2 ($C_2$) due to dynamic characteristics of the data packet flow. At this point, the class ($C_d$) determined with the dynamic flow classification method has converged with the class ($C_s$) determined with the static flow classification method and so, the classification of the data packet flow will henceforth be determined by the dynamic flow classification method, thus tracking any changes in the dynamic flow classification method's selection of classes. In the sample illustrated in FIG. 5A, the dynamic flow classification method eventually changes its determination of the class for the data packet flow to Class 3 ($C_3$) based upon the dynamic behaviour of the data packet flow, this resulting in the class for the data packet flow becoming Class 3 ($C_3$).

The above described example with reference to FIG. 5A illustrates an application of the second rule according to the preferred embodiments of the present invention. In this case, once the dynamic and static flow classification methods have converged, the class of the data packet flow is solely determined by the dynamic flow classification method.

In the second case illustrated in FIG. 5B, Class 3 ($C_3$) is determined as the class for the data packet flow with use of the static flow classification method being applied to the first packet of the data packet flow. Further, after the first packet of the data packet flow has been received, the dynamic flow classification method assigns Class 1 ($C_1$) as the class for the data packet flow. At this point, the class for the data packet flow is set to Class 3 ($C_3$), the static flow classification ($C_s$), using the flow classification method of FIG. 4.

Subsequently, after a further three packets have arrived, the dynamic flow classification method will reassign, the class of the data packet flow to Class 2 ($C_2$) due to dynamic characteristics of the data packet flow. At this point, the class of the flow remains at Class 3 ($C_3$), the static flow classification ($C_s$), since neither the condition of Rule 2 or Rule 3 described above have been met. Next, in this example, an additional period of 20 packets are analyzed with the dynamic flow classification method still determining that the data packet flow should be classified as a Class 2 ($C_2$) flow. At this point, N=24 =E($C_s$) =1+3+20. Assuming that the decision factor f is equal to one, if the dynamic and static flow classification methods do not converge after an additional packet, the condition of Rule 3 will be met, that is N will be greater than f*E($C_s$). At this point, the classification of the data packet flow will become based upon the dynamic flow classification method and hence will be modified to Class 2 ($C_2$)

The above described example with reference to FIG. 5B illustrates an application of the third rule according to the preferred embodiments of the present invention. In this case, once the number of packets needed for the dynamic flow classification to converge with the static flow classification has been exceeded, the class of the data packet flow is solely determined by the dynamic flow classification method. Essentially, the change in classification for the flow occurs in these cases because it is believed that the static flow classification method produced an inaccurate result.

There are numerous advantages to the preferred embodiments of the present invention as described herein above over one or both of the well-known flow classification techniques. For one, the initial use of a static flow classification method allows the flow classification according to the present invention described above to be utilized for short flows unlike typical dynamic flow classification methods. Further, the initial use of the static flow classification method increases the accuracy of a typical dynamic flow classification method between the start time of the flow and the point at which the dynamic flow classification's accuracy can be trusted.

The method according to preferred embodiments allows dynamic and static flow classification methods to confirm with each other that the correct class has been identified when they converge. Further, this method allows the correct flow class to be identified if the dynamic flow characteristics show that the static flow classification method has made an error. In this regard, it allows the detection of such errors to happen within the minimum number of packets required to guarantee the accuracy of the dynamic flow classification method. In essence, the accuracy of the flow classification method according to the preferred embodiments described above is no worse than the use of either by itself. The employment of the three simple rules described above allows seamless integration of the two very different flow classification strategies while retaining the strengths of both and avoiding their corresponding weaknesses.

It should be recognized that the preferred embodiments described herein above are not meant to limit the scope of the present invention. In particular, embodiments of the present invention could be implemented with only one of Rules 2 and 3 described above being applied. For instance, in one embodiment, the static flow classification method is used until the static and dynamic flow classifications converge. This does not allow for errors in the static flow classification method, but does allow for changes in the class once the flow classifications have converged. Further, in another embodiment, the static flow classification method is used for the data packet flow until the dynamic flow classification can be considered accurate, that being when the condition of Rule 3 has been met, without regard to the convergence of the classification methods.

In yet another alternative embodiment, there is no decision factor f consideration within the condition of Rule 3. This change essentially being equivalent to having a decision factor f of one as described above.

In a further embodiment, if it is determined that the static flow classification method cannot determine an accurate classification for the data packet flow, the dynamic flow classification method will initially take over. In cases of encrypted packets or non-standard protocol headers, for instance, it is not possible to perform protocol header matching and thus, normally, the class is set a default classification. For exemplary embodiments of the present invention, rather than setting the classification to the default, the classification is simply automatically set to the dynamic flow classification without the conditions of one of Rules 2 and 3 being met. Generally though, the defaults for both the static and dynamic flow classification methods are the same so that, if the above described automation is not made, Rule 2 would be met anyhow and therefore the classification is also set to the dynamic flow classification.

Although the preferred embodiments of the present invention have been described herein above as a method of classifying data packet flows, it should be understood that the scope of the present invention should not be limited to a method. For instance, embodiments of the present invention could be directed to an apparatus that operates to perform the method described above with the use of static classification logic, dynamic classification logic and classification selection logic. The apparatus such as this could be implemented anywhere within a data packet network, though preferably it would be within an apparatus that initiates the transfer of data packet flows, such as computing apparatus 10 and/or server 18 illustrated within FIG. 1. It should be understood that the logic being operated within the apparatus could be implemented with use of software, firmware, hardware and/or other logic implementation techniques. Further, embodiments of the present invention could apply to computer storage medium that contain software for applying the method described herein above for the embodiments of the present invention.

Further it should be noted that although the advantages of the present invention are particularly necessary within wireless implementations of data packet flows, embodiments of the present invention could further be applied to fixed wireline networks for data packet flow applications.

Yet further, although described herein above generally for data packet flows, the preferred embodiments of the present invention are specifically directed to Transmission Control Protocol (TCP) flows used within Internet Protocol (IP) implementations such as that illustrated in FIG. 1.

Persons skilled in the art will appreciate that there are yet more alternative implementations and modifications possible for implementing the present invention, and that the above implementations are only illustrations of certain embodiments of the invention. The scope of the invention, therefore, is only to be limited by the claims appended hereto.

We claim:

1. A computing apparatus arranged to receive a flow of data packets, the computing apparatus comprising:

static flow classification logic that operates to determine a static classification for the flow using static information corresponding to at least one of the packets;

dynamic flow classification logic that operates to determine a dynamic classification for the flow using dynamic information corresponding to a plurality of the packets within the flow; and classification selection logic that operates to initially assign the static classifications to the flow and subsequently assign the dynamic classification to the flow once at least one transitional test is passed.

2. A computing apparatus according to claim 1, wherein the transitional test is passed when the dynamic classification becomes equal to the static classification.

3. A computing apparatus according to claim 1, wherein the transitional test is passed when a predetermined number of packets within the flow have been received.

4. A computing apparatus according to claim 3, wherein the predetermined number of packets is equal to an estimated minimum number of packets required for the dynamic classification to become equal with the static classification.

5. A computing apparatus according to claim 3, wherein the predetermined number of packets is equal to a predetermined decision factor multiplied by an estimated minimum number of packets required for the dynamic classification to become equal to the static classification; and wherein the predetermined decision factor is between one and a maximum tolerance factor in which the estimated minimum number of packets could be in error by.

6. A computing apparatus according to claim 1, wherein the transitional test is passed when a predetermined time period has expired from initially receiving packets of the flow.

7. A computing apparatus according to claim 6, wherein the predetermined time period comprises an estimate of a time required for the dynamic classification to become equal to the static classification.

8. A computing apparatus according to claim 6, wherein the predetermined time period comprises a predetermined decision factor multiplied by an estimate of a time required for the dynamic classification to become equal to the static classification; and wherein the predetermined decision factor is between one and a maximum tolerance factor in which the estimate of the time could be in error by.

9. A computing apparatus according to claim 1, wherein the at least one transitional test is passed when at least one of first and second transitional tests is passed; and wherein the first transitional test is passed when the dynamic classification becomes equal to the static classification and the second transitional test is passed when a predetermined number of packets within the flow have been received.

10. A computing apparatus according to claim 9, wherein the predetermined number of packets is equal to an estimated minimum number of packets required for the dynamic classification to become equal to the static classification.

11. A computing apparatus according to claim 9, wherein the predetermined number of packets is equal to a predetermined decision factor multiplied by an estimated minimum number of packets required for the dynamic classification to become equal to the static classification; and wherein the predetermined decision factor is between one and a maximum tolerance factor in which the estimated minimum number of packets could be in error by.

12. A computing apparatus according to claim 1, wherein the at least one transitional test is passed when at least one of first and second transitional tests are passed; and wherein the first transitional test is passed when the dynamic and static classifications become equal and the second transitional test is passed when a predetermined time period has expired from initially receiving packets of the flow.

13. A computing apparatus according to claim 12, wherein the predetermined time period comprises an estimate of a time required for the dynamic classification to become equal to the static classification.

14. A computing apparatus according to claim 12, wherein the predetermined time period comprises a predetermined decision factor multiplied by an estimate of a time required for the dynamic classification to become equal to the static classification; and wherein the predetermined decision factor is between one and a maximum tolerance factor in which the estimate of the time could be in error by.

15. A computing apparatus according to claim 1, wherein the static information corresponding to at least one data packet of the flow comprises protocol header information.

16. A computing apparatus according to claim 1, wherein the data packets within the flow are Transmission Control Protocol (TCP) packets.

17. A computing apparatus arranged to receive a flow of data packets, the computing apparatus comprising:

static flow classification logic that operates to determine a static classification for the flow using static information corresponding to at least one of the packets;

dynamic flow classification logic that operates to determine a dynamic classification for the flow using dynamic information corresponding to a plurality of the packets within the flow; and classification selection logic that operates to initially determine if the static and dynamic classifications are equal; if the static and dynamic classifications are initially equal, assign the dynamic classification to the flow; and, if the static and dynamic classifications are not initially equal, initially assign the static classification to the flow and subsequently assign the dynamic classification to the flow once at least one transitional test is passed.

18. A method for assigning a flow classification to a flow of data packets, the method comprising:

determining a static classification for the flow using static information corresponding to at least one of the packets;

determine a dynamic classification for the flow using dynamic information corresponding to a plurality of the packets within the flow;

initially assigning the static classification to the flow; and subsequently assigning the dynamic classification to the flow once at least one transitional test is passed.

19. A method according to claim 18, wherein the transitional test is passed when the dynamic classification becomes equal to the static classification.

20. A method according to claim 18, wherein the transitional test is passed when a predetermined number of packets within the flow have been received.

21. A method according to claim 18, wherein the transitional test is passed when a predetermined time period has expired from initially receiving packets of the flow.

22. A method according to claim 18, wherein the at least one transitional test is passed when at least one of first and second transitional tests is passed; and wherein the first transitional test is passed when the dynamic classification becomes equal to the static classification and the second transitional test is passed when a predetermined number of packets within the flow have been received.

23. A method according to claim 22, wherein the predetermined number of packets is equal to an estimated minimum number of packets required for the dynamic classification to become equal to the static classification.

24. A method according to claim 22, wherein the predetermined number of packets is equal to a predetermined decision factor multiplied by an estimated minimum number of packets required for the dynamic classification to become equal to the static classification; and wherein the predetermined decision factor is between one and a maximum tolerance factor in which the estimated minimum number of packets could be in error by.

25. A method according to claim 18, wherein the at least one transitional test is passed when at least one of first and second transitional tests is passed; and wherein the first transitional test is passed when the dynamic and static classifications become equal and the second transitional test is passed when a predetermined time period has expired from initially receiving packets of the flow.

26. A method according to claim 25, wherein the predetermined time period comprises an estimate of a time required for the dynamic classification to become equal to the static classification.

27. A method according to claim 25, wherein the predetermined time period comprises a predetermined decision factor multiplied by an estimate of a time required for the dynamic classification to become equal to the static classification; and wherein the predetermined decision factor is between one and a maximum tolerance factor in which the estimate of the time could be in error by.

28. A method for assigning a flow classification to a flow of data packets, the method comprising:

determining a static classification for the flow using static information corresponding to at least one of the packets;

determining a dynamic classification for the flow using dynamic information corresponding to a plurality of the packets within the flow;

determining if the dynamic and static classifications are initially equal;

if the dynamic and static classifications are initially equal, assigning the dynamic classification to the flow, and if the dynamic and static classifications are not initially equal, initially assigning the static classification to the flow and subsequently assigning the dynamic classification to the flow once at least one transitional test is passed.

* * * * *

UNITED STATES PATENT AND TRADEMARK OFFICE

CERTIFICATE OF CORRECTION

PATENT NO. : 6,917,588 B1

APPLICATION NO. : 09/571160

DATED : July 12, 2005

INVENTOR(S) : Carl F. Cao et al.

It is certified that error appears in the above-identified patent and that said Letters Patent is hereby corrected as shown below:

Column 5, line 34, "$C_s$,=$C_d$" should read --$C_s$=$C_d$--;

Column 10, Claim 1, line 65, "...classifications..." should read --...classification...--;

Column 12, Claim 18, line 39, "...determine..." should read --...determining...--.

Signed and Sealed this

Sixth Day of March, 2007

JON W. DUDAS

*Director of the United States Patent and Trademark Office*